United States Patent [19]

Guilgue

[11] 4,203,544
[45] May 20, 1980

[54] METHOD FOR IDENTIFICATION OF CODED LABELS

[75] Inventor: Jean L. Guilgue, Vendome, France
[73] Assignee: Metalimphy, Paris, France
[21] Appl. No.: 877,384
[22] Filed: Feb. 13, 1978

[30] Foreign Application Priority Data

Mar. 25, 1977 [FR] France .................... 77 09110

[51] Int. Cl.$^2$ .................... G06K 7/08; G06K 19/06
[52] U.S. Cl. .................... 235/449; 235/493
[58] Field of Search .................... 235/449, 493, 450

[56] References Cited

U.S. PATENT DOCUMENTS

| | | | |
|---|---|---|---|
| 3,290,487 | 12/1966 | Scott | 235/450 |
| 3,686,479 | 8/1972 | Rogers et al. | 235/450 |
| 3,717,749 | 2/1973 | Rogers | 235/450 |
| 3,783,249 | 1/1974 | Wiegand | 235/493 |
| 3,790,754 | 2/1974 | Black et al. | 235/493 |
| 3,986,205 | 10/1976 | Fayling | 235/493 |
| 4,134,538 | 1/1979 | Lagarde et al. | 235/449 |

Primary Examiner—Daryl W. Cook
Attorney, Agent, or Firm—Haseltine, Lake & Waters

[57] ABSTRACT

A method for identifying an article provided with a coded magnetic member comprising creating a detection zone by supplying an exciter coil with exciting alternating current, passing the article with the coded magnetic member through the detection zone to produce at least one signal from the coded magnetic member and detecting the derived signal using a detector coil to determine the code of the magnetic member. The magnetic member is provided with at least one of a plurality of elements made of magnetic alloys each having a different hysteresis loop and a code value is assigned to each type of alloy. The code value of each of the elements is decoded by measuring the phase shift of the signal derived using the detector coil relative to the phase of the exciting alternating current. This phase shift is indicative of the type of alloy and of the code value assigned thereto.

2 Claims, 3 Drawing Figures

METHOD FOR IDENTIFICATION OF CODED LABELS

BACKGROUND OF THE INVENTION (a) Field of the Invention

The present invention relates to methods for the identification of coded labels carried by articles, for the purpose of starting an operation corresponding to the code detected, or for the purpose of a subsequent selective treatment of these articles. Throughout the following text, the term "label" will be understood in a very broad sense which applies both to the case where the elements used for coding are carried by a so-called label, which is itself fixed to or enclosed in the article, and to the case where the coding elements are carried directly by the article, for example by being glued thereto.

(b) Prior Art

The Assignees of the present invention have previously filed patent applications relating to methods for coding and identifying magnetically coded labels. In these applications, a magnetic tape is passed through a detection zone having at least one sensor, each sensor comprising an exciter coil supplied with an alternating current in order to create an alternating magnetic field and a detector coil which is tuned so that no signal is detected in the absence of a magnetic body near the sensor.

U.S. Pat. No. 4,134,538 discloses means for coding which uses a single magnetic element, the code being detected by measuring the amplitude of the detected signal, which can be altered by varying the height or area of the magnetic element.

Alternatively, several magnetic elements can be used which are made of alloys having different hysteresis loops. The coding is then achieved by placing the elements on the labels, so that the overall signal created due to the different hysteresis loops reproduces signals characteristic of each element in the same order as the elements are disposed on the label. Detection is achieved by locating the relative positions of the signals and by measuring the amplitude of each of these signals.

SUMMARY OF THE INVENTION

It is an object of the present invention to provide a method of coding and detection other than by amplitude detections, but which still uses the process of detecting the passage of a magnetic element in an alternating magnetic field.

According to the invention, there is provided a method for identifying an article provided with a coded magnetic member, comprising the steps of creating a detection zone by supplying an exciter coil with an exciting alternating current, passing the article provided with the coded magnetic member through the detection zone whereby to derive at least one signal from the coded magnetic member, and detecting said at least one signal derived from the coded magnetic member using a detector coil whereby to determine the code of the magnetic member; the improvement comprising the steps of providing the magnetic member with at least one of a plurality of elements made of magnetic alloys each having a different hysteresis loop, assigning a code value to each type of alloy, and decoding the code value of each of the elements by measuring the phase shift of the signal derived using the detector coil relative to the phase of the exciting alternating current, this shift being indicative of the type of alloy and of the code value assigned to it.

According to a particular embodiment of the invention, several elements, each chosen from the range depending on the code value which it is desired to assign thereto, are used on the same label, in order to form a code having several characters, and each character is passed successively and independently near the detector coil, the complete decoding being carried out in the detection device, and after identifying the code value belonging to each character, by sequenced regrouping of each character in the order in which it is scanned by the detector coil.

BRIEF DESCRIPTION OF THE DRAWING

In order that the present invention be more readily understood, an embodiment thereof will now be described, by way of example, with reference to the accompanying drawing, in which.

DESCRIPTION OF THE PREFERRED EMBODIMENT

As described in U.S. Pat. No. 4,134,538 the presence of a magnetic element causes a signal to be induced in a detection circuit of detection apparatus as a result of each change in direction of an exciting alternating field. The signal which is caused by the change in the direction of the magnitization of the element appears with a phase shift relative to the exciting field which depends on the hysteresis loop of the alloy forming the element.

According to the invention, the elements are preferably in the form of tapes or wires made from a range of alloys having different hysteresis loops, and a code value is assigned to each different alloy. Thus, for example, if it is possible to have ten types of alloy having sufficiently different loops, referred to as types A to J, it will be possible to assign to them ten respective code values of 0 to 9. Measurement of the phase shift of the signal relative to the change direction of the exciting field characterizes the type of alloy and hence the code assigned.

Figure 1:
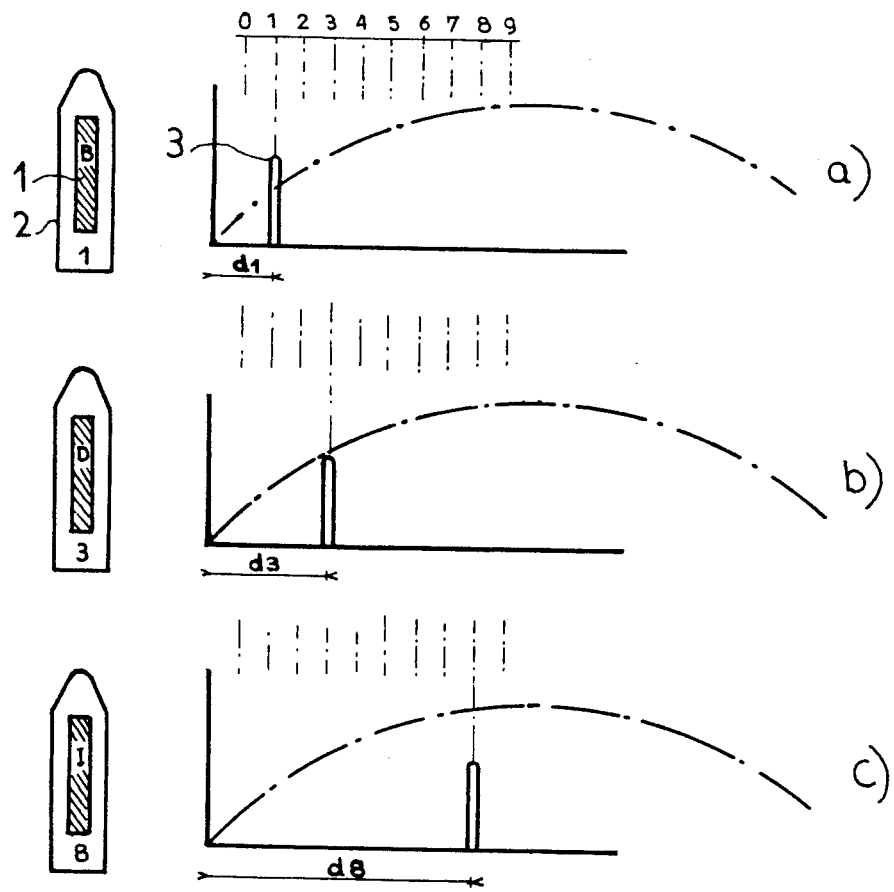
FIG. 1 is a schematic representation of the phase shifts of induced signals relative to an alternating magnetic field, and which depend on the nature of the alloys used for the magnetic elements.

In FIG. 1a, an alloy of type B is used for tape 1 carried by label 2; signal 3 will appear with a phase shift $d_1$ on reversal of the field. In FIG. 1b type D will cause the signal to appear with a phase shift $d_3$. In FIG. 1c, type I will cause the signal to appear with a phase shift $d_8$. Therefore, the electronic detection circuits will be able to identify the type of alloy used on the label, and hence the assigned value, by measuring the phase shift d. In the example given, a coding capacity of ten numbers will be available with a single tape, by the selective use of one or other of the ten types of alloy.

Figure 2:
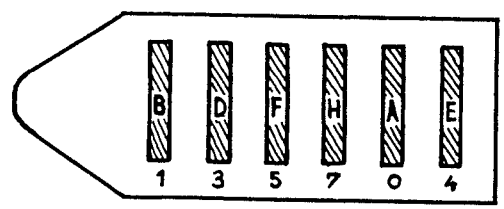
FIG. 2 shows a label provided with a plurality of magnetic elements and which is to be fixed on the article to be identified.
Figure 3:
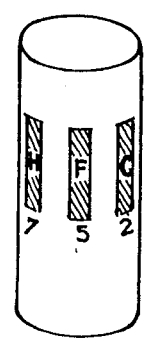
FIG. 3 shows a test sample to be identified, the sample having a plurality of magnetic elements directly glued to its surface.

It is possible to increase the coding capacity by using several tapes on the same label, each tape then being exposed separately and successively to coils for scanning and detection. The pick-up head containing the detection coil will thus have to be sufficiently narrow so as not to be influenced by the tapes which are next to the one which the coil is in the process of detecting. When each tape has been individually identified, the successive scannings are arranged in the order of scanning thus identifying the overall code. In the case where ten types of alloy are available, it can be seen that the use of six tapes, as in FIG. 2, gives a coding capacity of $10^6$. Thus, for the number of tapes A and the number of alloys B there are $B^A$ possibilities. With three tapes glued to the test sample as in FIG. 3, it will be possible for this test sample to be detected from 999 different samples.

The particular value of this coding and detection method is that, unlike other customary magnetic systems, the information carried cannot be erased. Furthermore, it becomes possible to scan at a distance sufficient to avoid soiling of the heads; this soiling is particularly problem in the case where the articles to be identified are likely to be soiled as, for example, in an industrial environment.

What is claimed is:

1. In a method for identifying an article provided with a numerically coded magnetic member, comprising the steps of creating a detection zone by supplying an exciter coil with an exciting alternating current, passing the article provided with the coded magnetic member through the detection zone whereby to derive at least one signal from the coded magnetic member, and detecting said at least one signal derived from the coded magnetic member using a detector coil whereby to determine the code of the magnetic member; the improvement comprising the steps of providing the magnetic member with at least one of plurality of elements made of magnetic alloys each having a different hysteresis loop, assigning a code value to each type of alloy, successively detecting the elements as they pass through said detection zone, and decoding the numerical code value of each of the elements by measuring the phase shift of the signal derived using the detector coil relative to the phase of the exciting alternating current, said phase shift being indicative of the type of alloy and of the code value assigned thereto, the number (A) of said elements of magnetic material and the number (B) of different alloys establishing said code of the magnetic member from $B^A$ possibilities, the position of the numerical code value of each element in the number code being determined by the order in which the elements are successively detected in the detection zone.

2. A method according to claim 1, wherein a plurality of elements, each having a code value assigned thereto, are used on one label in order to form a composite code having a plurality of characters, and wherein each element is passed sequentially through the detection zone, the improvement further comprising sequentially detecting the numerical code value of each element and identifying the composite code by regrouping each signal in the order in which it is scanned by the detector coil.

* * * * *